United States Patent
Wang

(10) Patent No.: US 11,267,657 B2
(45) Date of Patent: Mar. 8, 2022

(54) VERTICAL SORTER

(71) Applicant: Beijing Jingdong Qianshi Technology Co., Ltd., Beijing (CN)

(72) Inventor: Guopeng Wang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 104 days.

(21) Appl. No.: 16/497,159

(22) PCT Filed: Apr. 4, 2018

(86) PCT No.: PCT/CN2018/081982
§ 371 (c)(1),
(2) Date: Sep. 24, 2019

(87) PCT Pub. No.: WO2018/201844
PCT Pub. Date: Nov. 8, 2018

(65) Prior Publication Data
US 2021/0139253 A1    May 13, 2021

(30) Foreign Application Priority Data
May 5, 2017 (CN) .......................... 201710311770.1

(51) Int. Cl.
| | |
|---|---|
| B65G 47/46 | (2006.01) |
| H02J 50/10 | (2016.01) |
| B07C 3/08 | (2006.01) |
| B65G 35/08 | (2006.01) |
| B65G 54/02 | (2006.01) |
| B65G 47/49 | (2006.01) |
| H01R 41/00 | (2006.01) |

(52) U.S. Cl.
CPC ................ *B65G 47/46* (2013.01); *B07C 3/08* (2013.01); *B65G 35/08* (2013.01); *B65G 54/02* (2013.01);
(Continued)

(58) Field of Classification Search
CPC .... B65G 47/642; B65G 17/345; B65G 47/44; B65G 47/42; B65G 47/94; B65G 1/04;
(Continued)

(56) References Cited

U.S. PATENT DOCUMENTS 4,712,965 A * 12/1987 Canziani ................. B61B 13/04
414/339
5,588,520 A * 12/1996 Affaticati ................ B61B 13/08
198/370.06
(Continued)

FOREIGN PATENT DOCUMENTS

CN        1931628 A      3/2007
CN     204549120 U      8/2015
(Continued)

OTHER PUBLICATIONS

Search Report pertaining to Application No. PCT/CN2018/081982 dated Jul. 12, 2018.

*Primary Examiner* — James R Bidwell
(74) *Attorney, Agent, or Firm* — Dinsmore & Shohl LLP

(57) ABSTRACT

A vertical sorter having a track with at least two straight portions and at least two curved portions is disclosed. A linear motor primary coil is mounted on the at least two straight portions, and two adjacent straight potions are connected by at least one curved portion. Supply tables are disposed at ends of the at least two straight portions respectively and used for providing goods to each straight portion; chutes are disposed along two sides of the at least two straight portions and used for transporting the goods on each straight portion to corresponding areas; a sorting trolley is used for conveying the goods on the supply table to a corresponding chute; and a secondary magnet is mounted on the sorting trolley, wherein the linear motor primary coil and the secondary magnet cooperate to drive the sorting trolley to move along the track.

17 Claims, 4 Drawing Sheets

(52) U.S. Cl.
CPC ............ *H02J 50/10* (2016.02); *B65G 47/493* (2013.01); *B65G 2203/0266* (2013.01); *H01R 41/00* (2013.01)

(58) Field of Classification Search
CPC ................ B65G 47/96; B65G 1/0492; B65G 2203/0266; B65G 35/08; B65G 47/46; B65G 54/02; B65G 47/493; H02J 50/10; B07C 3/08
USPC ........................ 198/370.01–370.09
See application file for complete search history.

(56) References Cited

U.S. PATENT DOCUMENTS

| | | | | |
|---|---|---|---|---|
| 5,690,209 | A | * | 11/1997 | Kofoed ................ B65G 17/345 198/370.03 |
| 6,298,975 | B1 | * | 10/2001 | Fortenbery ............ B65G 47/38 104/284 |
| 7,863,536 | B2 | * | 1/2011 | Cerutti ..................... B07C 3/02 209/583 |
| 2002/0079254 | A1 | * | 6/2002 | Soldavini ............. B65G 17/345 209/606 |
| 2004/0134752 | A1 | * | 7/2004 | Miller .................. B65G 47/962 198/370.06 |
| 2010/0089274 | A1 | * | 4/2010 | Austin ................. B65G 17/345 104/118 |
| 2016/0001978 | A1 | * | 1/2016 | Ragan .................. B65G 47/844 198/370.02 |
| 2017/0057751 | A1 | * | 3/2017 | Fujihara ................ B65G 43/00 |
| 2019/0184430 | A1 | * | 6/2019 | Fumagalli .............. B65G 47/96 |

FOREIGN PATENT DOCUMENTS

| | | |
|---|---|---|
| CN | 106956887 A | 7/2017 |
| CN | 206720100 U | 12/2017 |
| JP | H03264408 A | 11/1991 |
| JP | 2007010534 A | 1/2007 |

* cited by examiner

VERTICAL SORTER

CROSS-REFERENCES TO RELATED DISCLOSURE

The application is a national stage of International Application No. PCT/CN2018/081982, filed on Apr. 4, 2018, which claims priority to Chinese Patent Application No. 201710311770.1, filed on May 5, 2017, the contents of each of which are incorporated herein by reference in their entireties.

TECHNICAL FIELD

The present disclosure relates to the field of warehouse logistics technology, specifically to a goods sorting technology, and more specifically to a vertical sorter.

BACKGROUND

A cross-belt sorter is typically a material conveyor that automatically sorts materials, and generally comprises a belt trolley and a transport track. The belt trolley is generally arranged on the transport track of the cross-belt sorter, and the running direction of the belt of the belt trolley is intersected with the advancing direction of the transport track. When the belt trolley moves to a specified sorting position, the belt of the belt trolley starts to rotate, so that articles move to both sides of the transport track to complete the tasks of sorting and delivering the articles.

However, the existing cross-belt sorters are available in planar and linear forms. The planar cross-belt sorter often only operates on an annular plane, and the structure thereof results in a large footprint in planar space and waste of vertical space. The linear cross-belt sorter is generally driven by a chain sprocket, and the structure thereof causes the sorter to work only in the upper half layer, which affects the sorting efficiency.

SUMMARY

In view of the above-discussed deficiencies in the prior art, the present disclosure provides an improved vertical sorter to solve the technical problems mentioned in the Background.

In order to realize the purpose above, an embodiment of the present disclosure provides a vertical sorter. The vertical sorter comprises: a track, comprising at least two straight portions and at least two curved portions, a linear motor primary coils being mounted on each of the at least two straight portions, and two adjacent straight portions are connected by at least one curved portion; a supply table, disposed at an end of each of the at least two straight portions and used for providing goods for each of the straight portions; a chute, disposed along each of two sides of each of the at least two straight portions and used for transporting the goods on the each straight portion to a corresponding area; and a sorting trolley, used for conveying the goods on the supply table to a corresponding chute, a secondary magnet being mounted on the sorting trolley, and the linear motor primary coil and the secondary magnet cooperate to drive the sorting trolley to move along the track.

In some embodiments, the vertical sorter comprises a plurality of sorting trolleys, and any two adjacent sorting trolleys are hinged to each other and move along the track circularly.

In some embodiments, each of the at least two straight portions and the sorting trolleys is provided with a wireless communication device and a wireless power supply unit, and the wireless communication device and the wireless power supply unit are respectively used for providing a communication signal and power for the sorting trolley.

In some embodiments, each of the at least two straight portions is provided with a wireless communication cable, and the sorting trolley is provided with a communication antenna; and each of the at least two straight portions is provided with a wireless power supply cable or a slide wire, and the sorting trolley is provided with an induction-coil plate or an electric brush.

In some embodiments, different chutes in the same straight portion are used for conveying goods to different areas.

In some embodiments, chutes in different straight portions are used for conveying goods to different areas; and at least one chute in any of the at least two straight portions is connected to the supply table in another straight portion.

In some embodiments, the supply table is provided with a barcode scanning device.

In some embodiments, the track is made of extruded aluminum profiles.

In some embodiments, the vertical sorter further comprises a support frame, and the support frame is used for supporting the track.

In some embodiments, the track is mounted on the support frame by a supporting leg, and a shock-absorbing part is provided on a contact area between the supporting leg and the support frame.

The vertical sorter provided in the embodiment of the present disclosure is provided with a plurality of straight portions on the track, so that goods may be sorted on the straight portions simultaneously, which not only saves the planar space occupied by the sorter, but also improves the sorting efficiency. In addition, the non-contact drive of the sorting trolley may be achieved by means of the cooperation between a linear motor primary coil mounted on the straight portion and a secondary magnet mounted on the sorting trolley, which not only helps to reduce the noise generated by the sorter during operation, but also increases the speed at which the sorting trolley moves along the track, thereby further improving the sorting efficiency.

BRIEF DESCRIPTION OF THE DRAWINGS

After reading detailed descriptions of non-limiting embodiments with reference to the following accompanying drawings, other features, objectives and advantages of the present disclosure will become more apparent.

FIG. 1b is a structural side view of the vertical sorter as shown in FIG. 1a;

FIG. 2 is a partial enlarged diagram of the vertical sorter at a place A as shown in FIG. 1a;

FIG. 3 is a partial schematic diagram of a track of the vertical sorter as shown in FIG. 1a;

FIG. 4 is a partial enlarged diagram of the vertical sorter at a place B as shown in FIG. 1a;

DETAILED DESCRIPTION OF EMBODIMENTS

The principles and features of the present disclosure will be further detailed in combination with the accompanying drawings and the embodiments. It should be appreciated that the specific embodiments described herein are merely used for explaining the relevant invention, rather than limiting the present disclosure. In addition, it should be noted that, for the ease of description, only the parts related to the present disclosure are shown in the accompanying drawings.

It should also be noted that the embodiments in the present disclosure and the features in the embodiments may be combined with each other on a non-conflict basis. The present disclosure will be described below in detail with reference to the accompanied drawings and in combination with the embodiments.

Figure 1A:
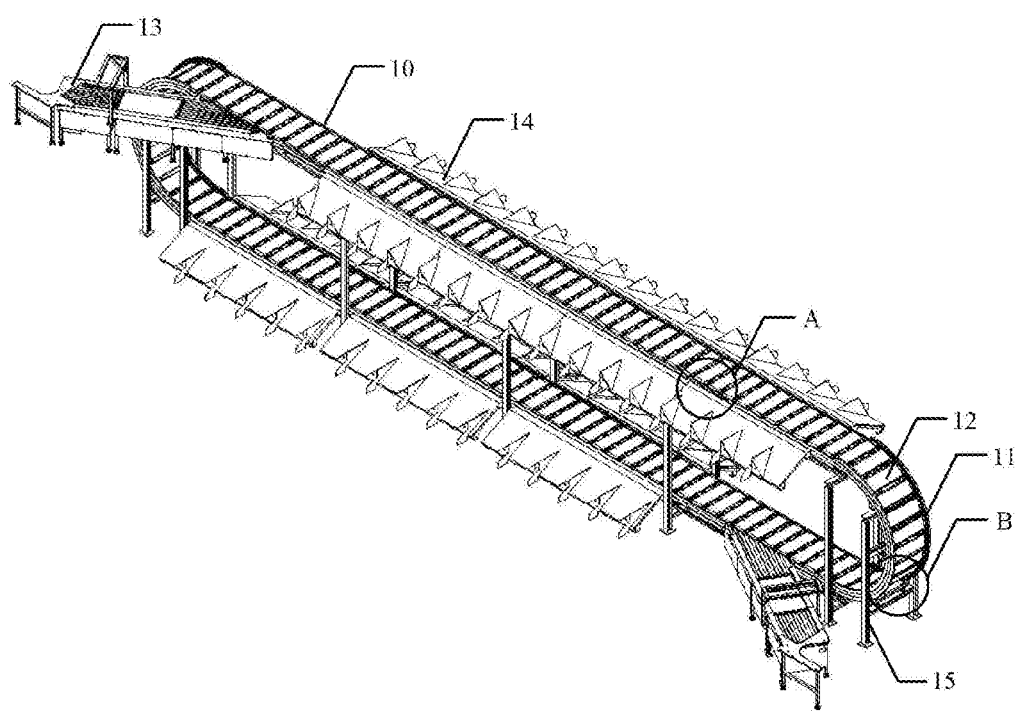
FIG. 1a is a structural schematic diagram of an embodiment of a vertical sorter provided by the present disclosure.
Figure 1B:
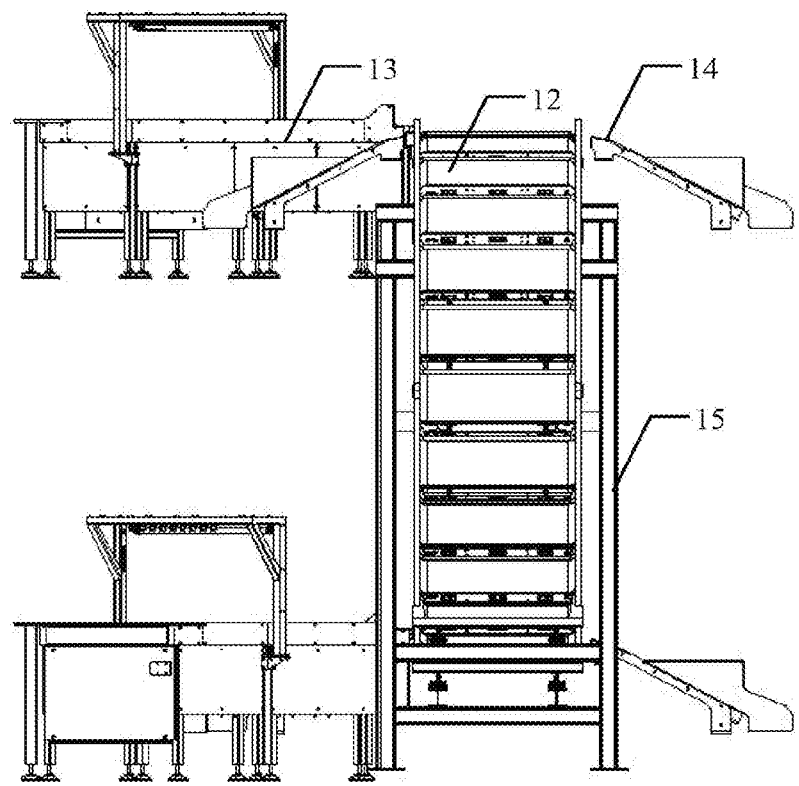

FIG. 1a and FIG. 1b are a three-dimensional schematic diagram and a side view of an embodiment of a vertical sorter provided by the present disclosure respectively.

In the present embodiment, the vertical sorter may comprise a track, supply tables, chutes and sorting trolleys. The track may comprise at least two straight portions and at least two curved portions, and two adjacent straight portions are connected by at least one curved portion; the supply tables are disposed at ends of the at least two straight portions respectively and used for providing goods for each of the straight portions; the chutes are disposed along two sides of the at least two straight portions and used for transporting the goods on the each straight portion to corresponding areas; and the sorting trolleys are used for conveying the goods on the supply tables to corresponding chutes.

As shown in FIG. 1a, the vertical sorter comprises two straight portions 10 and two curved portions 11. Both ends of the two straight portions 10 are respectively connected by the two curved portions 11, thereby forming a closed track, so that the sorting trolley 12 may circularly move along the track. It may be understood that the radius of the curved portion is set such that the sorting trolley 12 may be rotated for 180° around the curved portion. The supply tables 13 may be disposed at ends of the two straight portions, and the specific positions thereof are related to the moving direction of the sorting trolley 12 along the track. For example, the sorting trolley moves clockwise along the track, at this time, the sorting trolley on the upper straight portion (the straight portion farther from the ground) moves from left to right, and the supply table 13 may be disposed at the left end of the upper straight portion. At the same time, the chute 14, with respect to the supply table 13, may be disposed at the right end of the upper straight portion. However, the sorting trolley located on the lower straight portion (the straight portion closer to the ground) moves from right to left, and at this time, the supply table 13 may be disposed at the right end of the lower straight portion. Meanwhile, the chute 14, with respect to the supply table 13, may be disposed at the left end of the lower straight portion. In this way, more goods may be transported on the straight portion and more chutes may be provided, thereby increasing the sorting capacity of the vertical sorter.

Figure 2:
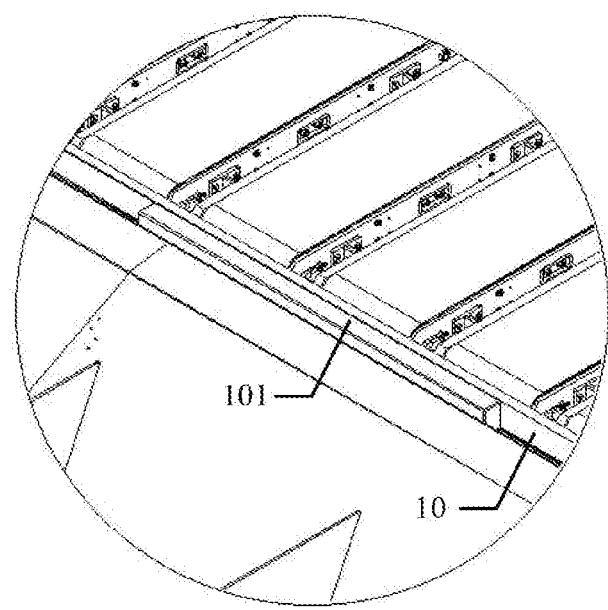

In the present embodiment, linear motor primary coils 101 may be mounted on the two straight portions 10, referring specifically to FIG. 2 which is a partial enlarged diagram of the vertical sorter at a place A. The non-contact drive of the sorting trolley may be achieved by means of the cooperation between the linear motor primary coil 101 and a secondary magnet (the secondary magnet 121 shown in FIG. 5) mounted on the sorting trolley, so as to drive the sorting trolley 12 to move along the track. Specifically, when an AC power source is introduced in the primary coil, a traveling wave magnetic field is generated in the air around the primary coil; the secondary magnet, as cut by the traveling magnetic field, induces an electromotive force and generates a current; the current acts with the magnetic field in air gap to generate an electromagnetic thrust. Since the primary coil is fixed, the electromagnetic thrust pushes the sorting trolley provided with the secondary magnet to move. Such driving approach may not only improve the moving speed of the sorting trolley, but also reduce the noise generated by the sorting trolley during movement. In addition, in such driving approach, the sorting trolley may carry the goods regardless of whether the sorting trolley is on the upper straight portion or on the lower straight portion of the sorter, thereby improving the sorting efficiency of the vertical sorter.

It should be noted that the two-layer structure of the vertical sorter shown in FIG. 1a is merely illustrative, and may be set as a multi-layer structure (for example, a serpentine structure) according to the actual requirements. At the same time, the position at which the linear motor primary coil is mounted on the straight portion is not limited, and the position at which the secondary magnet is mounted on the sorting trolley may be adjusted according to the position of the primary coil. Furthermore, on the premise that functional requirements are satisfied, it is possible (but not limited) to mount the linear motor primary coil only on one side of each straight portion, and the linear motor primary coils are located on the same side of the vertical sorter. Since the sorting trolley does not sort goods when the sorting trolley is in the curved portion, a primary coil may not be provided in the curved portion. The supply tables may also be located on the same side of the vertical sorter. However, the present disclosure does not limit such location, and the position may be set according to specific requirements.

The vertical sorter provided in the embodiment of the present disclosure is provided with a plurality of straight portions which are stacked along the direction perpendicular to the ground, so that goods may be sorted on the straight portions simultaneously, which not only saves the planar space occupied by the sorter, but also improves the sorting efficiency.

Figure 5:
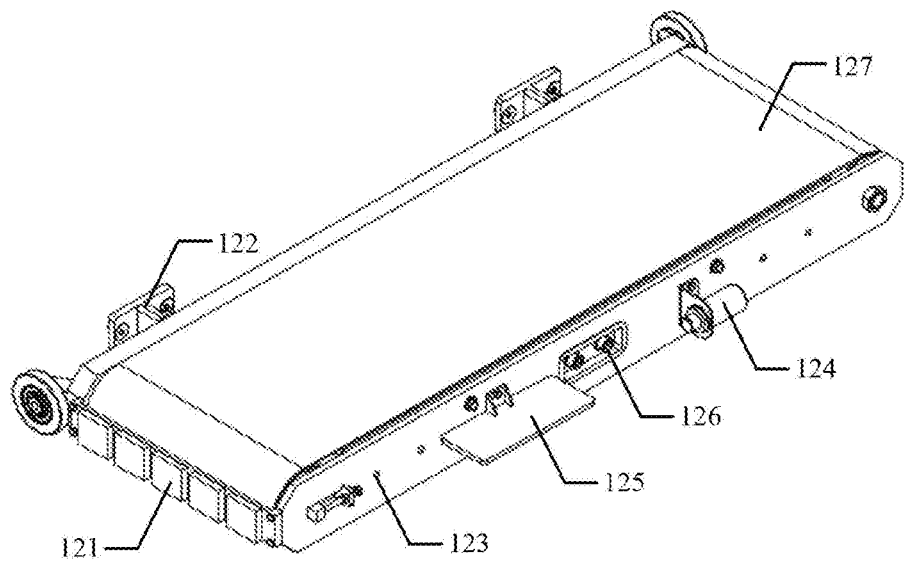
FIG. 5 is a structural schematic diagram of an embodiment of a sorting trolley in the vertical sorter provided by the present disclosure.

In some alternative implementations of the present embodiment, the vertical sorter may comprise a plurality of sorting trolleys. Any two adjacent sorting trolleys may be hinged to each other and circularly move along the track. At this time, the sorting trolley may be provided with a hinge part and/or a connecting hole. As shown in FIG. 5, the sorting trolley is provided with a hinge part 122 on one side along the moving direction of the track and a connecting hole 123 on the other side along the moving direction of the track. The hinge part 122 on the sorting trolley is screwed to a connecting hole 123 on another sorting trolley, which ensures the connection between the sorting trolleys so that the sorting trolley located on the straight portion may drive the sorting trolley located on the curve part under a driving force, and will not interfere with the relative rotation between the sorting trolleys when the sorting trolleys are moving in the curved portions.

Figure 3:
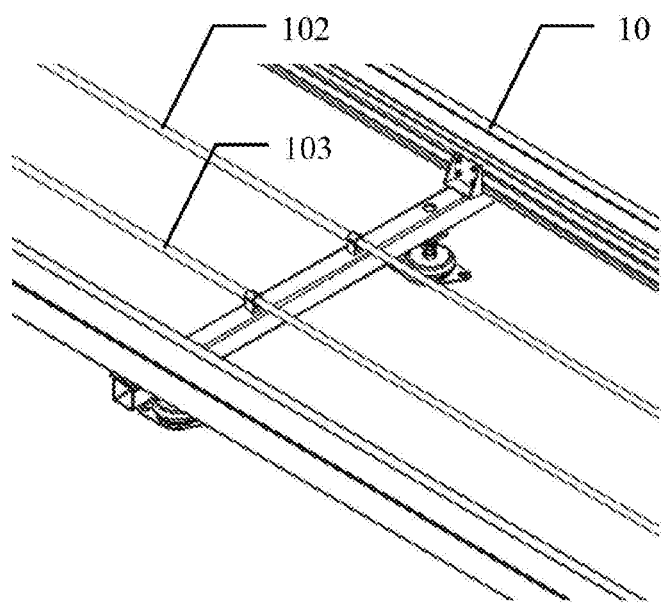

Optionally, a wireless communication device and a wireless power supply unit may be mounted on each of the straight portions and each of the sorting trolleys respectively. The wireless communication device and the wireless power supply unit are respectively used to provide communication signals and power for each sorting trolley. The wireless communication device may comprise a wireless communication cable and a communication antenna. The wireless power supply unit may comprise a wireless power cable and an induction coil, or a slide wire and an electric brush. As shown in FIG. 3, a wireless communication cable 102 and a wireless power supply cable 103 are mounted inside the straight portion. At this time, the sorting trolley, as shown in FIG. 5, is provided with a communication antenna 124 and an induction-coil plate 125 on one side in the moving direction of the sorting trolley along the track. An electrical signal generated between the induction-coil plate 125 and the wireless power supply cable 103 (the operation principles are well known in the art and will not be described herein) may supply power to a circuit component inside the sorting trolley, and the communication antenna 124 may receive the communication signal from the wireless communication cable 102 so as to control the sorting trolley to transport goods to a corresponding chute. When the sorting trolley moves to the corresponding chute under the driving of wheels rotating along the track, a belt on the sorting trolley (belt 127 shown in FIG. 5) is rotated, thereby transferring the goods on the sorting trolley to the chute. The chute then transports the goods to a corresponding area. It may be understood that when the communication signal and power received by a sorting trolley may simultaneously control a plurality of sorting trolleys, such sorting trolleys may be electrically connected to each other by means of plugs (as shown in FIG. 5, plugs 126 are provided on both sides of the moving direction along the track). In addition, the other sorting trolleys electrically connected to the sorting trolley may eliminate the need to mount the communication antenna and the induction-coil plate, thereby reducing the production cost.

Figure 6:
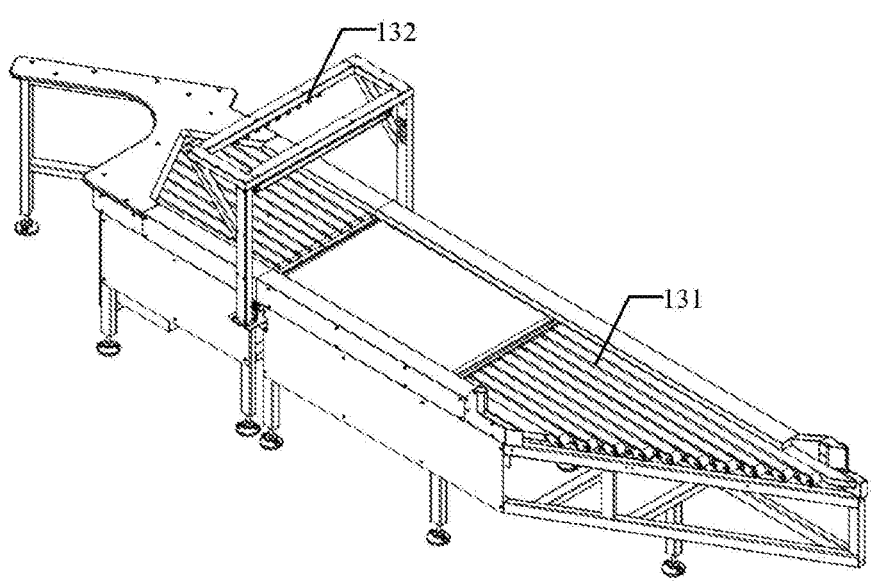
FIG. 6 is a schematic diagram of an embodiment of a supply table in the vertical sorter provided by the present disclosure.

As an example, a barcode scanning device may be mounted on the supply table 13 so as to further improve the sorting efficiency. As shown in FIG. 6, a conveyor belt 131 is provided on the supply table, and a barcode scanning device may be mounted on a bracket 132 above the conveyor belt 131. When the goods on the conveyor belt 131 are moved from one end of the supply table to the other end connected to the straight portion of the track, the barcode scanning device may scan a bar code or a QR code on the passing goods. The bar code or the QR code may comprise the destination to which the goods are to be delivered. After the barcode scanning device acquires the destination information of the goods, the destination information of the goods may be sent to the sorting trolley that transports such goods by means of the wireless communication device, so that the sorting trolley transports the goods to a chute corresponding to the destination information of the goods, thereby realizing the sorting of the goods.

It may be appreciated that different chutes may be used to transport goods to different areas in the same straight portion (i.e., different chutes may represent different destinations) so as to improve the sorting efficiency. The areas corresponding to chutes in different straight portions may be the same or different. For example, the chute 14 in the upper straight portion corresponds to three destinations, i.e., Beijing, Tianjin and Shanghai, and the chute 14 in the lower straight portion may also correspond to such three destinations. However, the chutes in the different straight portions may be used to transport the goods to different areas so as to further improve the sorting efficiency. That is to say, the destinations corresponding to the chutes in the different straight portions are different. At this time, in order to prevent the phenomenon that goods cannot be sorted in a certain straight portion (for example, the destinations corresponding to the chute in the straight portion do not include the destination of the to-be-sorted goods), at least one chute of any one of at least two straight portions may be connected to the supply table in the other straight portion. For example, when the goods move from left to right in the upper straight portion, the rightmost one of the chutes 14 may be connected to the supply table 13 in the lower straight portion. At the same time, when the goods move from the right to the left in the lower straight portion, the leftmost one of the chutes 14 may be connected to the supply table 13 in the upper straight portion, which ensures that the goods will eventually be sorted into a corresponding chute regardless of which straight portion the goods are in. It should be noted that the correspondence relationship between the chute in one straight portion and the supply table in another straight portion is not limited in the present embodiment. For example, when the vertical sorter comprises three straight portions, one of the straight portions may be respectively provided with one chute to be connected to the supply tables in the other two straight portions, or to be connected to the supply table in one of the other two straight portions.

In addition, in order to reduce the overall weight of the vertical sorter while meeting the load-bearing requirements, the track may be made of extruded aluminum profiles. Meanwhile, since aluminum is not magnetic, it does not affect the driving force generated between the linear motor primary coil and the secondary magnet. In addition, when an aluminum oxide film is formed on the outer surface of the track, it is more advantageous for extending the service life of the track since the aluminum oxide film has the characteristics of water resistance, acid resistance and high melting point.

Figure 4:
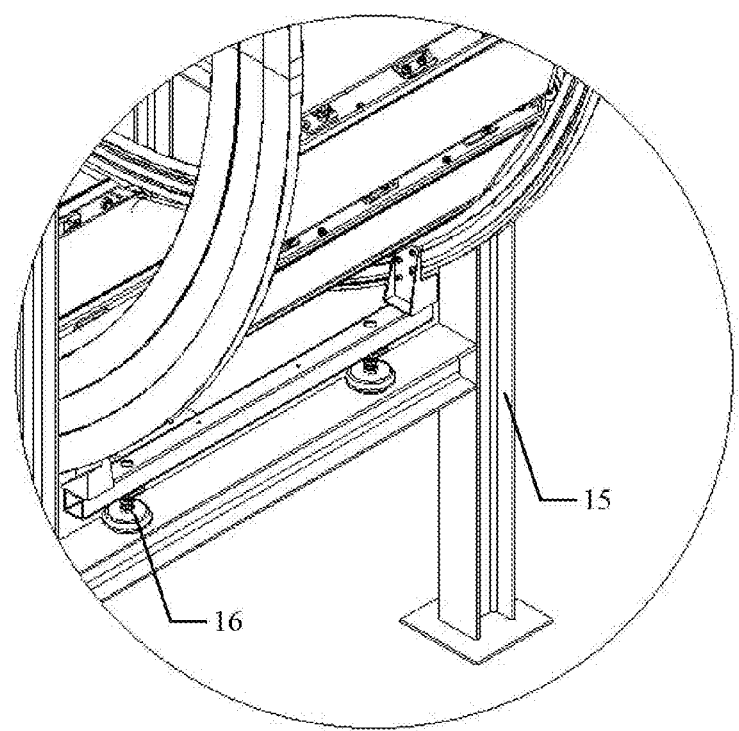

As may be seen in FIG. 1a, the vertical sorter may also comprise a support frame 15. The support frame 15 is used to support the track. In order to improve the stability of the support, the support frame 15 may be a steel support frame. As an example, the track may be mounted on the support frame 15 by means of support legs. FIG. 4 is a partial enlarged diagram of the vertical sorter at a place B. In order to reduce the vibration transmission generated during the goods sorting process, the contact surface between the support leg 16 and the support frame 15 may be provided with a shock-absorbing part, thereby absorbing the shock. The shock-absorbing member may be (but not limited to) a rubber mat. Further, the height of the support leg 16 is adjustable such that the track may be leveled by adjusting the height of each support leg 16 when a dimensional deviation occurs between the support frame 15 and the track.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A vertical sorter, comprising:
a track, comprising at least two straight portions and at least two curved portions, a linear motor primary coil being mounted on each of the at least two straight portions, and two adjacent straight portions being connected by at least one curved portion and being overlapped in a vertical direction, wherein the vertical direction is a direction perpendicular to a surface of the at least two adjacent straight portions;
a supply table, disposed at an end of each of the at least two straight portions and used for providing goods for each of the straight portions;
a chute, disposed along each of two sides of each of the at least two straight portions and used for transporting the goods on the each straight portion to a corresponding area;
and a sorting trolley, configured to move on the surface and convey the goods on the supply table to a corresponding chute,
a secondary magnet being mounted on the sorting trolley, wherein the linear motor primary coil and the secondary magnet are configured to cooperate to drive the sorting trolley to move along the track.

2. The vertical sorter according to claim 1, wherein the vertical sorter comprises a plurality of sorting trolleys, and any two adjacent sorting trolleys are hinged to each other and move along the track circularly.

3. The vertical sorter according to claim 2, wherein each of the at least two straight portions and the sorting trolleys is provided with a wireless communication device and a wireless power supply unit, and the wireless communication device and the wireless power supply unit are respectively used for providing a communication signal and power for the sorting trolley.

4. The vertical sorter according to claim 3, wherein each of the at least two straight portions is provided with a wireless communication cable, and the sorting trolley is provided with a communication antenna; and
each of the at least two straight portions is provided with a wireless power supply cable or a slide wire, and the sorting trolley is provided with an induction-coil plate or an electric brush.

5. The vertical sorter according to claim 1, wherein different chutes in the same straight portion are used for conveying goods to different areas.

6. The vertical sorter according to claim 1, wherein chutes in different straight portions are used for conveying goods to different areas; and
at least one chute in any of the at least two straight portions is connected to the supply table in another straight portion.

7. The vertical sorter according to claim 1, wherein the supply table is provided with a barcode scanning device.

8. The vertical sorter according to claim 1, wherein the track is made of extruded aluminum profiles.

9. The vertical sorter according to claim 1, further comprising a support frame, wherein the support frame is used for supporting the track.

10. The vertical sorter according to claim 9, wherein the track is mounted on the support frame by a supporting leg, and a shock-absorbing part is provided on a contact area between the supporting leg and the support frame.

11. The vertical sorter according to claim 2, further comprising a support frame, wherein the support frame is used for supporting the track.

12. The vertical sorter according to claim 3, further comprising a support frame, wherein the support frame is used for supporting the track.

13. The vertical sorter according to claim 4, further comprising a support frame, wherein the support frame is used for supporting the track.

14. The vertical sorter according to claim 5, further comprising a support frame, wherein the support frame is used for supporting the track.

15. The vertical sorter according to claim 6, further comprising a support frame, wherein the support frame is used for supporting the track.

16. The vertical sorter according to claim 7, further comprising a support frame, wherein the support frame is used for supporting the track.

17. The vertical sorter according to claim 8, further comprising a support frame, wherein the support frame is used for supporting the track.

* * * * *